(12) United States Patent
Loebner et al.

(10) Patent No.: US 6,305,507 B1
(45) Date of Patent: Oct. 23, 2001

(54) DISK BRAKES FOR RAIL VEHICLES

(75) Inventors: Reinhard Loebner, Muehldorf; Martin Lehmair, Munich, both of (DE)

(73) Assignee: Knorr-Bremse Systeme fuer Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/359,440

(22) Filed: Jul. 22, 1999

(30) Foreign Application Priority Data

Jul. 24, 1998 (DE) ............................................... 198 33 445

(51) Int. Cl.[7] ............................................... F16D 55/2255
(52) U.S. Cl. .......................................... 188/72.6; 188/72.7
(58) Field of Search ................................ 188/72.6, 72.7, 188/72.8, 72.5, 153 D, 367, 368, 369

(56) References Cited

U.S. PATENT DOCUMENTS

| | | | |
|---|---|---|---|
| 4,060,153 | * 11/1977 | Kobelt | 188/72.6 |
| 4,089,393 | * 5/1978 | Kalk | 188/72.6 |
| 4,270,631 | * 6/1981 | Kobelt | 188/72.9 |
| 4,393,962 | * 7/1983 | Kobelt | 188/72.6 |
| 4,592,451 | * 6/1986 | Persson | 188/72.3 |

FOREIGN PATENT DOCUMENTS 0 731 286    9/1996  (EP) .

* cited by examiner

*Primary Examiner*—Matthew C. Graham
(74) *Attorney, Agent, or Firm*—Crowell & Moring LLP

(57) ABSTRACT

A disk brake for rail vehicles has an actuating device that has a lever designed to transfer deflections of a braking force generator to a pressure element. A parallel alignment of the pressure element, as well as of a brake pad pressed by the pressure element against a friction ring, is guaranteed by at least one slot guide between an at least approximately fixed part of the disk brake and the pressure element. The slot guide has two pins that engage displaceably and offset with respect to one another in two slot path segments which are designed to be at least approximately in the form of a segment of a circular arc and each have different radii.

31 Claims, 3 Drawing Sheets

DISK BRAKES FOR RAIL VEHICLES

BACKGROUND AND SUMMARY OF THE INVENTION

This application claims the priority of German application 198 33 445.1, filed in Germany Jul. 24, 1998, the disclosure of which is expressly incorporated by reference herein.

The invention relates to a disk brake for rail vehicles with an actuating device that has a lever on one or both sides of a rub ring, said lever being designed to transfer the deflections of an (especially hydraulically) actuated braking force generator on a pressure element to actuate at least one brake pad, with the pressure element being pivotably mounted on a rotational axis on the lever, and with at least one guide slot between an at least approximately fixed part of the disk brake and the pressure element, ensuring a largely fixed alignment of the pressure element as well as the brake pad relative to the rub ring.

A disk brake of this type is known from European Patent Document EP 0 731 286 A 1. The disk brake shown in this document, which is provided, however, for pneumatic actuation, is provided with a guide slot to avoid radial diagonal wear of at least one brake pad which is pivotable to a limited degree around an axis that extends approximately in the circumferential direction of a rub ring at the center of friction. The guide slot is located at a distance from the pressure bearing, with the distance having at least one component that runs parallel to the alignment of the rub ring. The guide path and the corresponding sliding block are mounted on an essentially fixed part and also on the brake pad by means of a steering lever, with the slot path running essentially parallel to the axial direction of the rub ring. If the pressure bearing is guided for example by a forked lever on a circular path, the slot path is advantageously designed to be curved in the same way as the circular path. Radial diagonal wear is simply prevented by the slot guide.

The above design of the slot guide has proven itself in use. However, a design that is simplified further as much as possible remains desirable, which operates safely even with increasing wear of the brake. The goal of the invention is to achieve this result.

The invention achieves this goal by providing a disk brake for rail vehicles comprising: an actuating device which has a lever on at least one side of a rub ring, said lever being designed to transfer deflections of a hydraulically actuated braking force generator on a pressure element to actuate at least one brake pad, the pressure element being pivotably mounted on a pivotal axis on the lever, wherein a largely unchanged alignment of the pressure element as well as the brake pad relative to the rub ring is guaranteed by at least one slot guide between an at least approximately fixed part of the disk brake and the pressure element, and wherein the at least one slot guide has two pins which engage displaceably and offset with respect to one another in at least two slot path segments which are designed to be at least approximately in a shape of a section of a circular arc and each have different radii.

In contrast to the prior art referred to above, the at least one slot guide has two pins that engage displaceably and offset with respect to one another in two slot path sections which are designed to be at least approximately in the form of a segment of a circular arc and have different radii. Preferably, one of the circular arc segments extends essentially concentrically with respect to the lever arm movement.

The invention offers the particular advantage that the first slot or the first slot path segment and the corresponding pin is designed as a slider in a structurally simple fashion (especially without a steering arm) in such fashion that it essentially has the same radius as the lever for actuating the brake pad, so that the pin, regardless of the position of the lever, always guarantees the horizontal alignment of the pressure element or the parallel alignment of the pressure element with respect to the rub ring. As a result, in the case of a new brake pad, in other words one that is not yet worn, pivoting of the pressure element around its rotational axis at the lever is reliably prevented.

The second slot with a different radius and another pin also counteracts the effect that the effective lever arm of the first pin or of the first slot guide becomes increasingly smaller as the lever pivots further inward. With considerable wear of the brake lining, the first pin has practically no further effect. At this point, however, the other slot guide or the other slot path section with the second pin S2 engages, which has a sufficient lever arm to the rotational axis of the brake pad. Thus, the function of the slot guide is guaranteed effectively in a structurally simplified and especially compact fashion even with increasing wear of the brake pads.

According to a preferred version of the invention, the slot path sections are designed as groove-shaped recesses in at least one guide plate. Preferably, the guide plate is fastened to the pressure element, with the slot guide path being aligned essentially parallel to the actuation of the brake pad. This version of the invention has the particular advantage that the necessity for designing a more complicated steering lever design for the slot guide is eliminated. It is merely necessary to manufacture the guide plates and to allow the pin to engage them.

According to certain especially preferred embodiment of the invention, one of the plates is fastened at each of the upper and lower ends of the pressure element, with the corresponding pins being formed on the brake caliper. As a result of the slot guide on the upper and lower ends and on the ends of the pressure element facing away from the lever, an especially secure slot guide is guaranteed.

In an alternative embodiment, it is also contemplated for the two slot path sections to be formed jointly in only one of the plates, so that the cost for making the slot guide is reduced further.

Other objects, advantages and novel features of the present invention will become apparent from the following detailed description of the invention when considered in conjunction with the accompanying drawings.

DETAILED DESCRIPTION OF THE DRAWINGS

Figure 1:
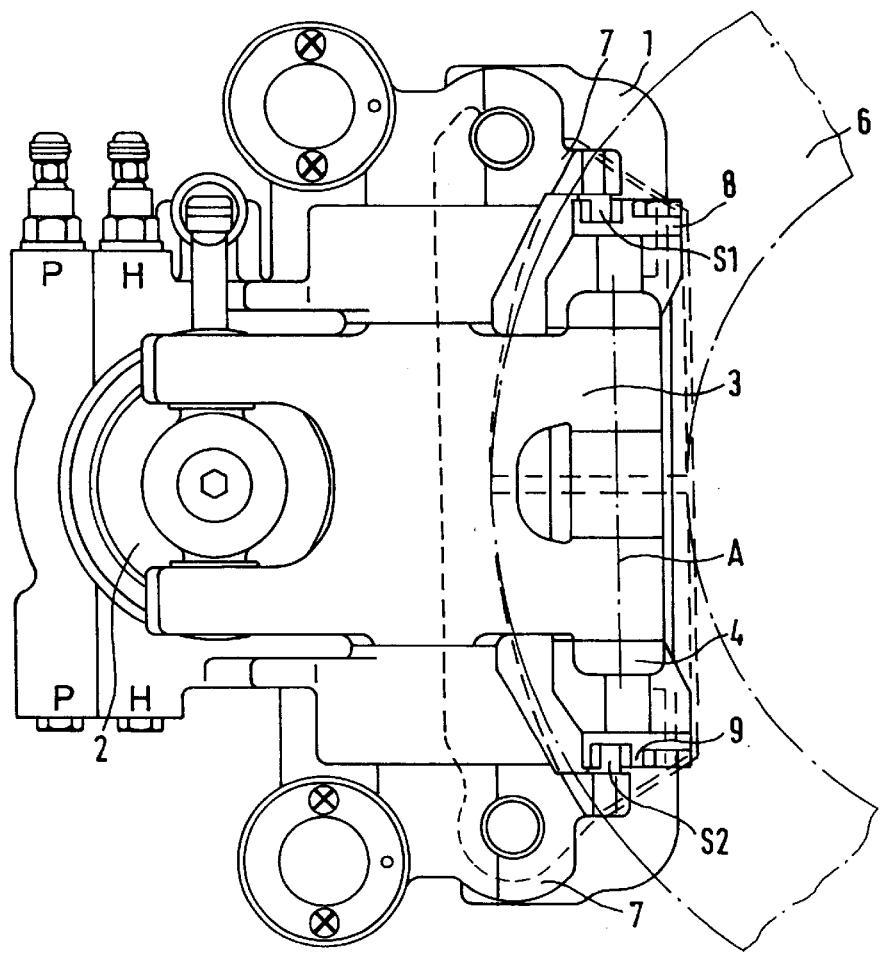
FIG. 1 is a side view of a hydraulically operated disk brake according to the invention, with a hydraulically actuated brake caliper arrangement.
Figure 2:
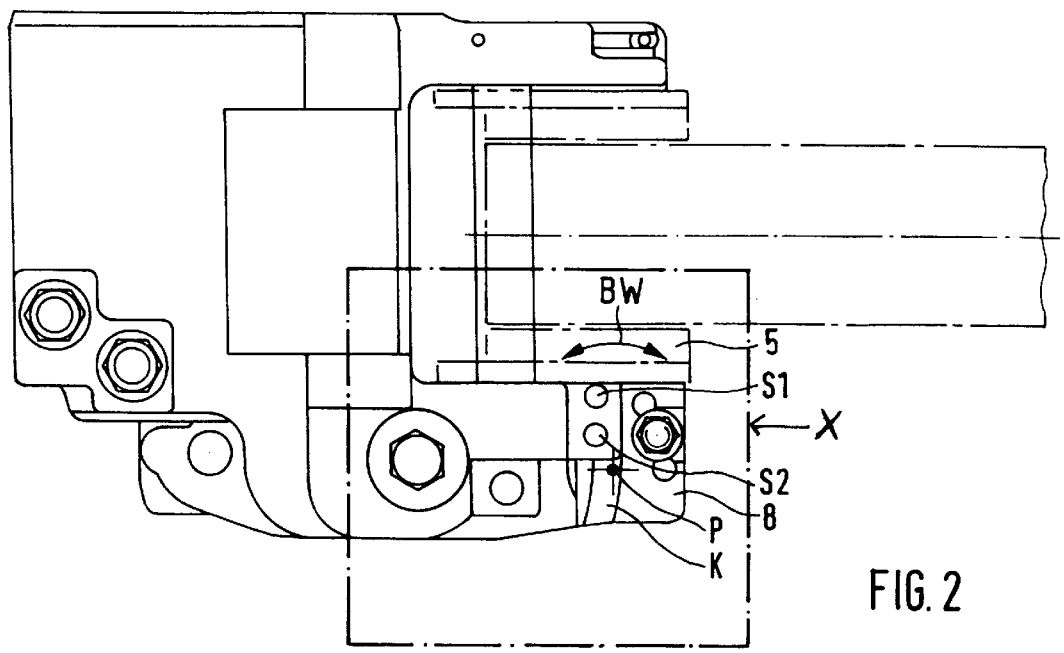
FIG. 2 is a schematic top view of the embodiment in FIG. 1 showing the first plate and the first slot guide section.

FIG. 1 shows a hydraulically actuated disk brake for rail vehicles with a brake caliper 1 with lever translation. The force generator 2 integrated into brake caliper 1 transmits tensioning force on pressure element 4 through lever 3, said element being mounted at its axis A on lever 3 and acting on brake pad 5 or the brake lining that presses during braking against rub rings 6. In FIG. 2, Point P shows the position of the axis A according to FIG. 1.

To prevent pivoting movements of pressure element 4 around axis A or to prevent rotary movements BW a double slot guide is provided which reliably counteracts diagonal wear of brake pad 5 (see FIG. 2).

Figure 3:
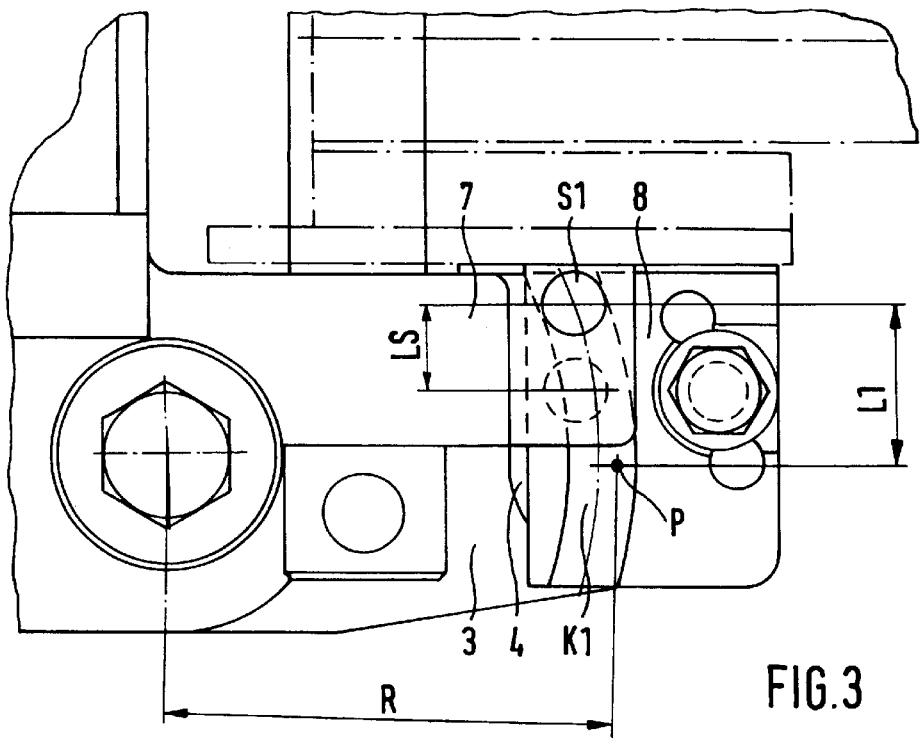
FIG. 3 is a partial enlargement of section X of FIG. 2.
Figure 4:
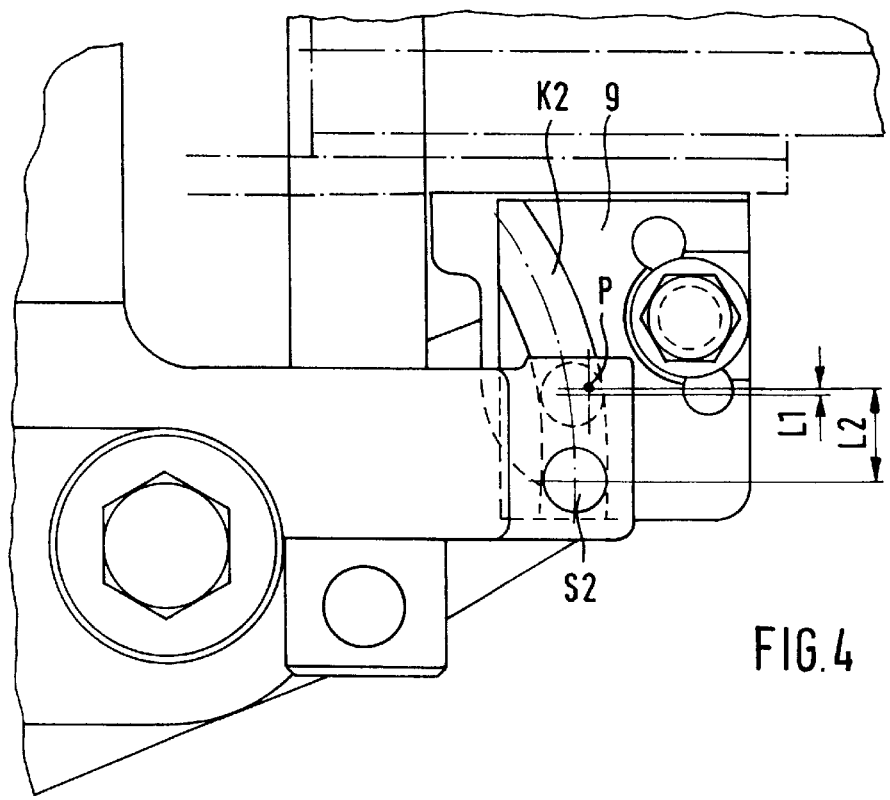
FIG. 4 shows a portion of the FIG. 1 embodiment enlarged similarly to FIG. 3, showing the second plate and the second slot guide section shown.

The double slot guide (parallel guide) consists of two pins S1 and S2 each of which is permanently connected with the yoke of the brake caliper (for example, molded on the latter), as well as of two separate plates 8, 9, which are permanently connected at the ends facing away from lever 3 ("top" and "bottom") with pressure element 4 and each is provided with a slot path or a slot path section K1, K2 (see also FIG. 3 and FIG. 4).

The function of the parallel guide shown in FIGS. 1–4 is clear from the various representations in FIG. 3 and FIG. 4. Thus, to make the function of the invention clearer, the upper plate 8 is shown in a lever position which corresponds to the state "brake pad and lining new" while FIG. 4 shows the lower plate 9 in the lever position "brake pad and brake lining worn."

FIG. 3 shows that the first slot path K1 is machined into the upper plate 8 which has a circular arc curvature with a radius that corresponds to the Radius R of the lever arm (distance between the lever bearing and axis A), so that the pin S1 which is formed on the upper part of brake caliper yoke 7 ensures the horizontal position of pressure element 4 independently of the position of lever 3 during brake actuation. The effective lever arm L1 of pin S1, with increasing inward pivoting of lever 3 or with increasing wear of the brake lining and brake ring 6, becomes steadily smaller since the position of pin S1 approaches Point P and finally, in the "worn" position in FIG. 4 is located, so to speak, on the extension of axis A, so that pin S1 can have practically no further effect.

In this case, pin S2 engages the other slot on the lower plate 9 (FIGS. 1 and 3), which slot has a slot path K2 with a radius different from Radius R, and which has a lever arm L2 to Point P. With increasing wear of the brake pad or the rub rings 6 and the brake pads 5, the function of the slot guide is ensured in simple fashion.

In theory, the two pins, S1 and S2, are always engaged with the two slots, K1 and K2. It is merely necessary to note that the efficacy of each of the pins, S1 and S2, depends on the size of the values L1 and L2. The smallest possible size of dimensions L1 and L2 is half the distance LS of the two pins from one another. As a result it turns out that the function of the parallel guide increases in accuracy directly with the distance LS.

Figure 5:
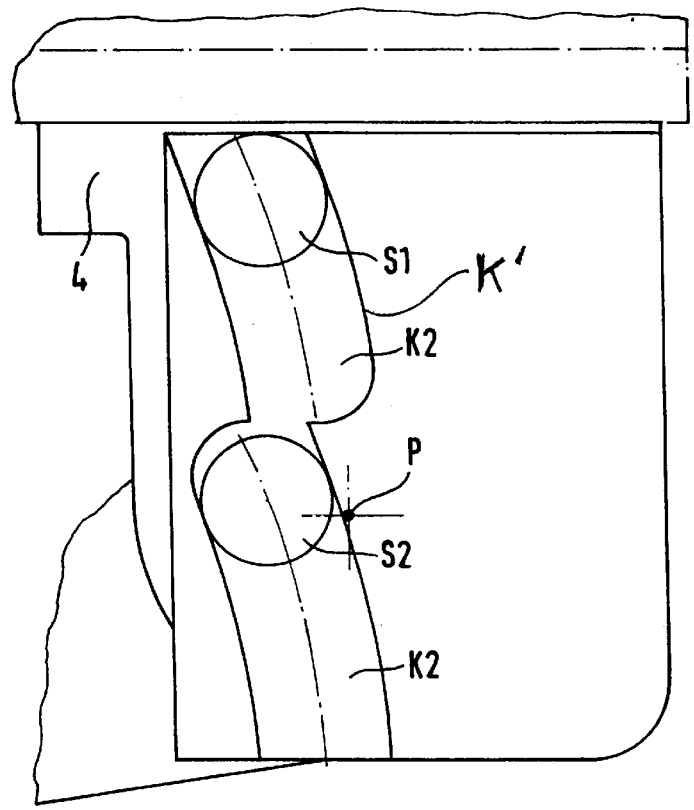
FIG. 5 is a partial enlarged view of another embodiment of the invention.
Figure 6:
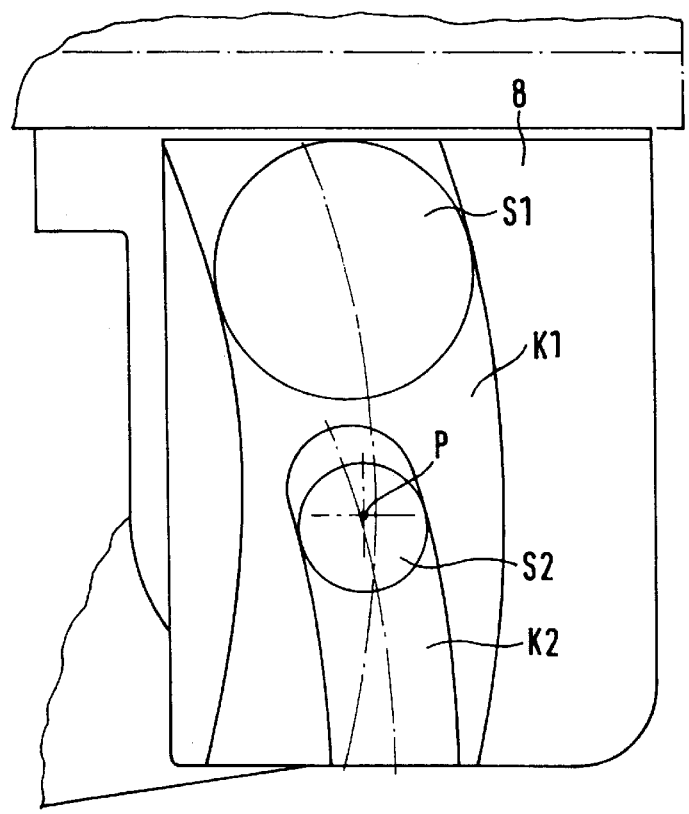
FIG. 6 is a partial enlargement of a third embodiment of the invention.

FIGS. 5 and 6 show two versions of the solution which, further simplified in terms of design, use only one plate 8 which is fastened to one end of the pressure element, with the pins being located side by side on brake caliper yoke 7.

According to FIG. 5, only a single groove $K^1$ is formed in plate 8 which has two path Sections K1, K2 with different radii but is effective for both pins S1 and S2.

The solution shown in FIG. 6, on the other hand, is distinguished by different pin diameters. Slot K2 is also machined more deeply in this embodiment than is slot K1.

Finally, it should be noted that the positions of the two pins S1 and S2 with respect to one another is arbitrary. The important thing is merely that one of the slots for each pin position guarantees the horizontal position of pressure element 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake assembly comprising: a brake frame,
   a brake actuating lever pivotally mounted at the brake frame,
   a pressure element pivotally connected to the actuating lever for movement about a pressure element pivot axis and operable to press a brake pad against a rub ring to apply braking forces to the rub ring, and
   a pressure element aligning assembly operable in use to maintain the pressure element and brake pad in alignment,
   wherein said aligning assembly includes:
      at least one slot guide with two slot path sections which are fixed with respect to one of the brake frame and pressure element and which extend along different paths with respect to the pressure element pivot axis, and
      a pair of guide pins fixed with respect to the other of the brake frame and pressure element, said guide pins being spaced from one another and being engageable in respective ones of the slot path sections.

2. A disk brake assembly according to claim 1, wherein the two slot path sections are formed as groove-shaped recesses in a common guide plate.

3. A disk brake assembly according to claim 2, wherein the common guide plate is fastened to the pressure element of the brake pad such that the slot path sections are aligned essentially parallel to an actuating direction of the brake pad.

4. A disk brake assembly according to claim 3, wherein the guide plates are fastened to an end of the pressure element facing away from the brake actuating lever,
   wherein the brake frame is a brake caliper, and
   wherein the guide pins are formed on the brake caliper.

5. A disk brake assembly according to claim 3, wherein respective widths of the two slot path sections and of the pins engaging them are different.

6. A disk brake assembly according to claim 2, wherein the guide plates are fastened to an end of the pressure element facing away from the brake actuating lever,
   wherein the brake frame is a brake caliper, and
   wherein the guide pins are formed on the brake caliper.

7. A disk brake assembly according to claim 6, wherein respective widths of the two slot path sections and of the pins engaging them are different.

8. A disk brake assembly according to claim 2, wherein respective widths of the two slot path sections and of the pins engaging them are different.

9. A disk brake assembly according to claim 2, wherein respective depths of the two slot path sections in the guide plate are different.

10. A disk brake assembly according to claim 2, wherein lever arms between the pins and the pressure element pivot axis correspond in length at least to half the distance between the pins in the slot path sections.

11. A disk brake assembly according to claim 2,
    wherein the two slot path sections include a first slot path section and a second slot path section, and wherein a radius of the first slot path section essentially corresponds to a length of a lever arm of the actuating lever.

12. A disk brake assembly according to claim 1, wherein the two slot path sections are designed as groove-shaped recesses separately from one another in two separate guide plates.

13. A disk brake assembly according to claim 12, wherein the guide plates are fastened to the pressure element of the brake pad such that the slot path sections are aligned essentially parallel to an actuating direction of the brake pad.

14. A disk brake assembly according to claim 13, wherein the guide plates are fastened to an end of the pressure element facing away from the brake actuating lever, wherein the brake frame is a brake caliper, and wherein the guide pins are formed on the brake caliper.

15. A disk brake assembly according to claim 12, wherein the guide plate is fastened to an end of the pressure element facing away from the brake actuating lever, wherein the brake frame is a brake caliper, and wherein the guide pins are formed on the brake caliper.

16. A disk brake assembly according to claim 12, wherein respective widths of the two slot path sections and of the pins engaging them are different.

17. A disk brake assembly according to claim 12, wherein respective depths of the two slot path sections in the guide plates are different.

18. A disk brake assembly according to claim 12, wherein lever arms between the pins and the pressure element pivot axis correspond in length at least to half the distance between the pins in the slot path sections.

19. A disk brake assembly according to claim 12, wherein the two slot path sections include a first slot path section and a second slot path section, and wherein a radius of the first slot path section essentially corresponds to a length of a lever arm of the actuating lever.

20. A disk brake assembly according to claim 1, wherein the guide pins are fixed with respect to the brake frame and the slot path sections are fixed with respect to the pressure element.

21. A disk brake assembly according to claim 1, wherein respective widths of the two slot path sections and of the pins engaging them are different.

22. A disk brake assembly according to claim 1, wherein lever arms between the pins and the pressure element pivot axis correspond in length at least to half the distance between the pins in the slot path sections.

23. A disk brake assembly according to claim 1, wherein the two slot path sections include a first slot path section and a second slot path section, and wherein a radius of the first slot path section essentially corresponds to a length of a lever arm of the actuating lever.

24. A disk brake assembly according to claim 1, wherein said brake disk assembly is a rail vehicle brake disk assembly.

25. A disk brake assembly according to claim 1, wherein said slot path sections extend along circles of respective different radii.

26. A disk brake assembly according to claim 25, wherein the guide pins are fixed with respect to the brake frame and the slot path sections are fixed with respect to the pressure element.

27. A disk brake assembly according to claim 26, wherein said brake disk assembly is a rail vehicle brake disk assembly.

28. A disk brake assembly according to claim 26, wherein the two slot path sections include a first slot path section and a second slot path section, and wherein a radius of the first slot path section essentially corresponds to a length of a lever arm of the actuating lever.

29. A disk brake assembly according to claim 28, wherein said pair of guide pins includes a first guide pin engaged in use in the first slot path section and a second guide pin engaged in use in the second slot path section, and wherein said second guide pin and slot path section are disposed to counteract diminished guidance to the pressure element by the first guide pin and slot path section which results from brake pad wear effectively decreasing an effective length of a distance between the first guide pin and the pressure element pivot axis.

30. A disk brake assembly according to claim 1, wherein the two slot path sections include a first slot path section and a second slot path section, wherein said pair of guide pins includes a first guide pin engaged in use in the first slot path section and a second guide pin engaged in use in the second slot path section, and wherein said second guide pin and slot path section are disposed to counteract diminished guidance to the pressure element by the first guide pin and slot path section which results from brake pad wear effectively decreasing an effective length of a distance between the first guide pin and the pressure element pivot axis.

31. A disk brake assembly according to claim 29, wherein said brake disk assembly is a rail vehicle brake disk assembly.

* * * * *